United States Patent
Brady

(10) Patent No.: US 11,420,589 B2
(45) Date of Patent: Aug. 23, 2022

(54) SYSTEMS AND METHODS TO LOCALIZE A RECREATIONAL TRAILER

(71) Applicant: Thor Tech, Inc., Elkhart, IN (US)

(72) Inventor: Edward Brady, Delaware, OH (US)

(73) Assignee: Thor Tech, Inc., Elkhart, IN (US)

(*) Notice: Subject to any disclaimer, the term of this patent is extended or adjusted under 35 U.S.C. 154(b) by 399 days.

(21) Appl. No.: 16/745,858

(22) Filed: Jan. 17, 2020

(65) Prior Publication Data

US 2020/0231120 A1    Jul. 23, 2020

Related U.S. Application Data

(60) Provisional application No. 62/794,318, filed on Jan. 18, 2019.

(51) Int. Cl.
*B60R 25/08* (2006.01)
*H02S 40/38* (2014.01)
(Continued)

(52) U.S. Cl.
CPC .............. *B60R 25/08* (2013.01); *B60L 53/51* (2019.02); *B60R 16/0231* (2013.01);
(Continued)

(58) Field of Classification Search
CPC ..... B60R 25/08; B60R 25/2009; B60R 25/32; B60R 25/33; B60R 16/0231;
(Continued)

(56) References Cited

U.S. PATENT DOCUMENTS

2008/0270076 A1   10/2008   Breed
2013/0147617 A1*  6/2013   Boling .................. G08B 21/18
                                                    340/431
(Continued)

FOREIGN PATENT DOCUMENTS

EP         1515879 A1    3/2005
WO     2006089284 A2    8/2006
(Continued)

OTHER PUBLICATIONS

International Search Report and Written Opinion dated May 18, 2020 relating to International Application No. PCT/ US2020/014013.

*Primary Examiner* — Orlando Bousono
(74) *Attorney, Agent, or Firm* — Dinsmore & Shohl, LLP

(57) ABSTRACT

Trailer localizing systems and methods include a trailer to be coupled to the tow vehicle for towing and comprising solar panels and a tracking device communicatively coupled with a location determination device to transmit a current real time position of the trailer when active. The system is configured to determine whether the trailer is electronically connected to the tow vehicle, whether the solar panels are active upon a determination that the trailer is not electrically connected to the tow vehicle, activate the tracking device along with the location determination device upon a determination that the trailer is electronically connected to the tow vehicle, the plurality of solar panels are active, or both, generate an alert that the tracking device is active upon activation of the tracking device, and transmit the current real time position of the trailer with the alert to track the trailer.

20 Claims, 5 Drawing Sheets

(51) Int. Cl.
*H04W 4/029* (2018.01)
*B60L 53/51* (2019.01)
*B60R 16/023* (2006.01)
*B60R 16/033* (2006.01)
*B60R 25/20* (2013.01)
*B60R 25/32* (2013.01)
*B60R 25/33* (2013.01)
*G01S 19/16* (2010.01)

(52) U.S. Cl.
CPC ........ *B60R 16/033* (2013.01); *B60R 25/2009* (2013.01); *B60R 25/32* (2013.01); *B60R 25/33* (2013.01); *G01S 19/16* (2013.01); *H02S 40/38* (2014.12); *H04W 4/029* (2018.02)

(58) Field of Classification Search
CPC ...... B60R 16/033; H02S 40/38; H04W 4/029; B60L 53/51; G01S 19/16; B62D 63/08; B60T 7/20; B60D 1/26; B60D 1/36; B60D 1/62

See application file for complete search history.

(56) References Cited

U.S. PATENT DOCUMENTS

| 2016/0023587 | A1* | 1/2016 | Bean | B60Q 1/305 |
| | | | | 340/431 |
| 2018/0099712 | A1* | 4/2018 | Bean | B62D 63/08 |
| 2019/0111984 | A2* | 4/2019 | Bean | G01M 17/007 |
| 2020/0143174 | A1* | 5/2020 | Luo | G08G 1/167 |

FOREIGN PATENT DOCUMENTS

| WO | 2018187858 A1 | 10/2018 |
| WO | 2019165489 A1 | 9/2019 |

* cited by examiner

SYSTEMS AND METHODS TO LOCALIZE A RECREATIONAL TRAILER

CROSS-REFERENCE TO RELATED APPLICATIONS

The present specification claims priority to U.S. Provisional Application No. 62/794,318, filed Jan. 18, 2019, entitled "SYSTEMS AND METHODS TO LOCALIZE A RECREATIONAL VEHICLE," the entirety of which is incorporated by reference herein.

BACKGROUND

Recreational trailers may temporarily couple to a vehicle to be moved from one location to another. By their nature, recreational trailers are stored or left at a particular location for an extended period of time. Often, the extended period of time is when the recreational trailers are left or stored without supervision from their owner. As such, recreational trailers are often subject to theft. To assist in knowing when an unauthorized movement of the recreational trailer is occurring and/or to assist in tracking the unauthorized movement of the recreational trailer, systems and methods for tracking the recreational trailer may be utilized.

Accordingly, a need exists for systems and methods for localizing recreational trailers.

SUMMARY

In an embodiment, a trailer localizing system comprises a tow vehicle, a trailer configured to be coupled to the tow vehicle for towing by the tow vehicle, a memory, and machine readable instructions stored in the memory. The trailer comprises a plurality of solar panels, a location determination device, a tracking device communicatively coupled with the location determination device to transmit a current real time position of the trailer when the tracking device is active, and an electronic control unit communicatively coupled to the plurality of solar panels, the tracking device, and the location determination device. The memory is communicatively coupled to the electronic control unit. The machine readable instructions cause the trailer localizing system to perform at least the following when executed by the electronic control unit: determine by the electronic control unit whether the trailer is electronically connected to the tow vehicle, determine whether the plurality of solar panels are active upon a determination that the trailer is not electrically connected to the tow vehicle, activate the tracking device along with the location determination device upon a determination that the trailer is electronically connected to the tow vehicle, the plurality of solar panels are active, or both, generate an alert that the tracking device is active upon activation of the tracking device, and transmit the current real time position of the trailer with the alert to track the trailer.

In another embodiment, a trailer localizing system comprises a tow vehicle, a trailer, a memory, and machine readable instructions stored in the memory. The trailer is configured to be coupled to the tow vehicle for towing by the tow vehicle and comprises a plurality of solar panels, a location determination device, a tracking device communicatively coupled with the location determination device to transmit a current real time position of the trailer when the tracking device is active, and an electronic control unit communicatively coupled to the plurality of solar panels, the tracking device, and the location determination device. The memory is communicatively coupled to the electronic control unit, and the machine readable instructions cause the trailer localizing system to perform at least the following when executed by the electronic control unit: determine by the electronic control unit whether the trailer is electronically connected to the tow vehicle, determine whether the plurality of solar panels are active upon a determination that the trailer is not electrically connected to the tow vehicle, determine by the electronic control unit whether a wheel of the trailer is rotating at a wheel speed that is above a threshold speed, and activate the tracking device along with the location determination device upon a determination that the trailer is electronically connected to the tow vehicle, the plurality of solar panels are active, the wheel of the trailer is rotating at the wheel speed that is above the threshold speed, or combinations thereof. The machine readable instructions further cause the trailer localizing system to perform at least the following when executed by the electronic control unit: generate an alert that the tracking device is active upon activation of the tracking device, wherein the alert is configured to prompt a user to indicate whether movement of the trailer is authorized, and transmit the current real time position of the trailer with the alert to track the trailer.

In one other embodiment is a method of tracking a trailer configured to be coupled to a tow vehicle for towing by the tow vehicle. The trailer comprises a plurality of solar panels, a location determination device, a tracking device communicatively coupled with the location determination device to transmit a current real time position of the trailer when the tracking device is active, and an electronic control unit communicatively coupled to the plurality of solar panels, the tracking device, and the location determination device. The method comprises determining by the electronic control unit whether the trailer is electronically connected to the tow vehicle, determining whether the plurality of solar panels are active upon a determination that the trailer is not electrically connected to the tow vehicle, and activating the tracking device along with the location determination device upon a determination that the trailer is electronically connected to the tow vehicle, the plurality of solar panels are active, or both. The method further comprises generating an alert that the tracking device is active upon activation of the tracking device, and transmitting the current real time position of the trailer with the alert to track the trailer.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
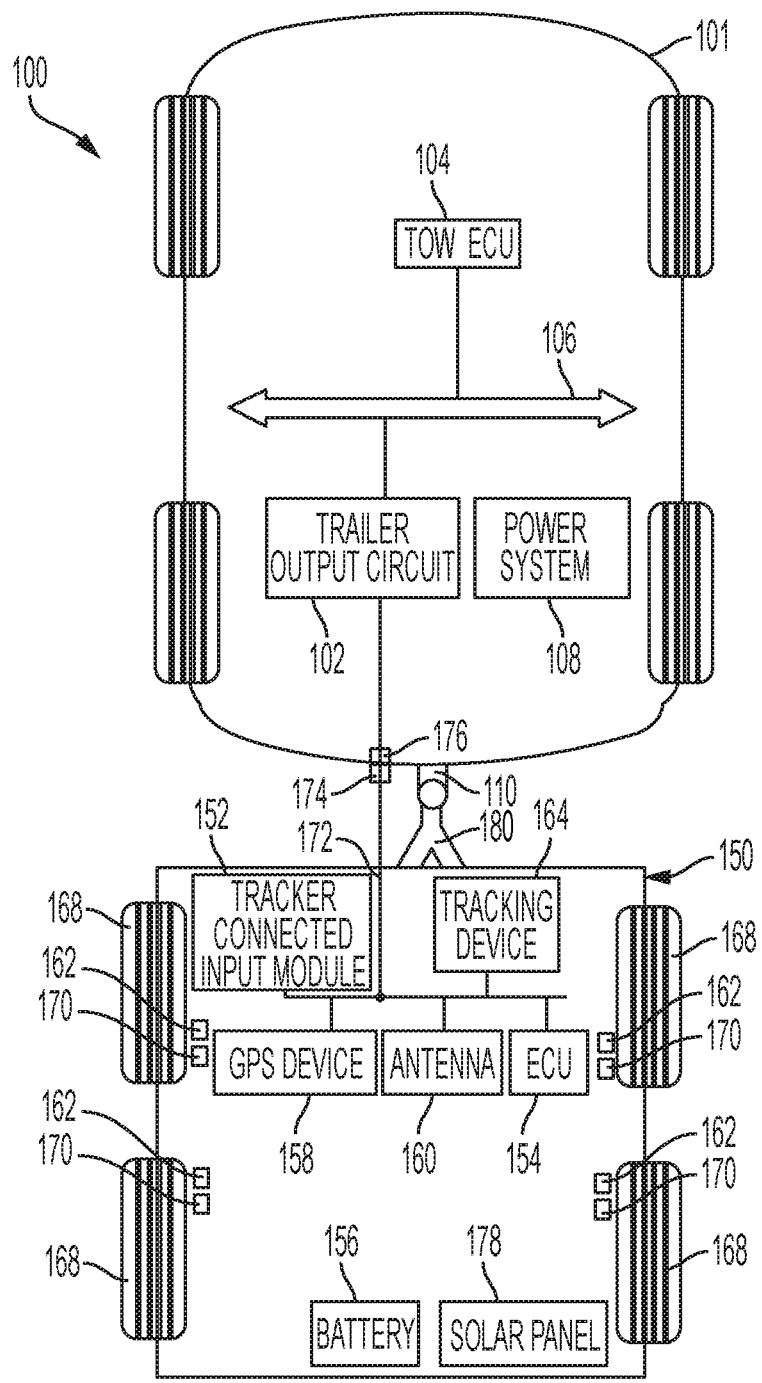
FIG. 1 schematically depicts a vehicle and a recreational trailer having a trailer localizing system, according to one or more embodiments shown and described herein.

The embodiments disclosed herein include systems and methods for localizing, or tracking, a recreational trailer while the trailer is moving. This movement may be authorized or unauthorized. Referring generally to the figures, an electronic control unit ("ECU") configured to localize or track the recreational trailer is provided. The ECU is disposed within the recreational trailer and is in communication with a tracking device, a GPS device, an antenna, and/or the like. The ECU is configured to enable the tracking device, the GPS device and the localizing software whenever the recreation trailer is in electrical communication with a tow vehicle. The electrical communication may be by connecting a female electrical connector of the recreational trailer to a male electrical connector of the vehicle, such as those generally associated with 4-way and 7-way connectors. When there is an electrical connection between the recreational trailer and the tow vehicle, the ECU establishes a tracking beacon, a localization beacon, or a plurality of tracking information that monitors the recreational trailer position. The ECU may transmit a current location, in real-time, of the recreational trailer. Further, when the ECU establishes the tracking beacon based on the electrical connection between the recreational trailer and the vehicle, the ECU and the tracking beacon cannot be manually overridden. In some embodiments, the tracking information is transmitted to a predetermined personal electronic device such as a mobile phone or a laptop. Further, in these embodiments, an owner or user may elect to indicate that the recreational trailer has unauthorized movement. In some embodiments, the recreational trailer further includes wheel sensors that are configured to detect a wheel speed of the trailer. In this embodiment, when the user indicates that the recreational trailer has unauthorized movement, the trailer brakes may be applied by the ECU to lock the recreational trailer when the recreational trailer is at a stopped condition. The various systems and methods for localizing the recreational trailer during movement of the recreational trailer will be described in more detail herein with specific reference to the corresponding drawings.

The phrase "communicatively coupled" is used herein to describe the interconnectivity of various components of the tracking system and means that the components are connected either through wires, optical fibers, or wirelessly such that electrical, optical, and/or electromagnetic signals may be exchanged between the components. As such, coupled components are capable of exchanging data signals with one another such as, for example, electrical signals via conductive medium, electromagnetic signals via air, optical signals via optical waveguides, and the like. It should be understood that other means of connecting the various components of the system not specifically described herein are included without departing from the scope of the present disclosure.

Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

Referring now to FIG. 1, a trailer localizing system 100 is schematically depicted. In one embodiment, an exemplary tow vehicle 101 is coupled to and operable to tow an exemplary trailer 150. The trailer 150 may be any trailer capable of having the components as described herein and capable of being towed by the tow vehicle 101. By way of non-limiting example, in some embodiments, the exemplary trailer 150 may be a recreational trailer. In other embodiments, the exemplary trailer 150 may be a pop-up camper trailer, a travel trailers, a cargo trailer such as a snowmobile trailer, a motorcycle trailer, and a bicycle trailer, a utility trailer, a dump trailer, a semi or a full trailer, a livestock trailer, and/or the like.

The trailer 150 includes a trailer connected input module 152, an electronic control unit ("ECU") 154, a battery 156, a location determination device 158 (e.g., a global position system ("GPS") and/or global navigation satellite system ("GNSS")), an antenna 160, a plurality of wheel speed sensors 162, a tracking device 164, and a communication path 166. The various components of the tow vehicle 101 and the interaction thereof will be described in detail below.

The trailer 150 further includes a plurality of trailer wheels 168, each trailer wheel 168 having at least one trailer brake 170 and the at least one wheel speed sensor 162. As depicted in FIG. 1, the trailer 150 includes four trailer brakes 170, one for each trailer wheel 168 and four separate speed sensors of the wheel speed sensors 162, one coupled to each trailer wheel 168. However, it should be understood that in other embodiments, the trailer 150 may include more than or less than four trailer brakes 170 and/or wheel speed sensors 162.

Still referring to FIG. 1, the trailer connected input module 152 is communicatively coupled to the communication path 166, to the tracking device 164, to the ECU 154, and to the location determination device 158. The trailer connected input module 152 is configured to detect when the trailer 150 is electrically coupled to the tow vehicle 101. The trailer connected input module 152 may be configured to detect a signal, a closed circuit current, a closed circuit voltage, and/or the like when the trailer 150 is electrically coupled to the tow vehicle 101. It should be appreciated that the electric coupling between the trailer 150 and the tow vehicle 101 may be by a connector such as a four-way connector, a seven-way connector, and/or the like. The trailer 150 is configured to be electronically connected to the tow vehicle 101 through an electrical coupling comprising the connector as an electrical connector. Generally, the trailer 150 has a pigtail containing a first connector 174 (as one of a female connector and a male connector) specifically configured to mate with a second connector 176 (as the other of the female connector and the male connector) embedded within the tow vehicle 101. As such, when the connectors 174, 176 are electrically coupled, the trailer connected input module 152 may detect this coupling by detecting the signal, the closed circuit current, the closed circuit voltage, and/or the like transmitted from the tow vehicle 101 to the trailer 150. In some embodiments, the trailer connected input module 152 may alert other components of the trailer 150, such as the ECU 154, the tracking device 164, the location determination device 158, and/or the like via a signal that indicates that the trailer 150 is electrically coupled to the tow vehicle 101. FIG. 1 illustrates that the trailer 150 is electrically coupled to the tow vehicle 101 via the pigtail having the first connector 174 mating to the second connector 176 thereby creating an electrical connection 172 between the tow vehicle 101 and the trailer 150.

In some embodiments, the trailer connected input module 152 may act as an interface between the ECU 154 and other components, such as the location determination device 158, other navigation systems, meter units of a vehicle, mobile phone systems, infotainment systems, and/or the like. In other embodiments, the trailer connected input module 152 may be utilized to transmit one or more commands to the other components of the trailer 150.

In some embodiments, the trailer connected input module 152 may determine when a connection between the tow vehicle 101 and the trailer 150 exists or is disrupted based on a camera mounted to the trailer 150 and object recognition software that may use machine learning to determine whether the trailer 150 is connected to the tow vehicle 101. In other embodiments, a receiver hitch 180 of the trailer 150 may include a plurality of sensors, switches, and/or the like, that monitor and transmit a signal when the trailer 150 is attached to the tow vehicle 101 (i.e., sensors positioned to determine when a lock of the receiver hitch 180 is in use, sensors positioned to determine when a ball of a hitch 110 is within the receiver hitch 180, and/or the like).

The location determination device 158 may be communicatively coupled to the ECU 154, the trailer connected input module 152, and the tracking device 164 by the communication path 166. The location determination device 158 may be any device capable of providing a plurality of signals and/or communicating with components, such as the antenna 160, the tracking device 164, and the ECU 154 for the purposes of, in real-time, localizing or tracking the trailer 150, triangulating the trailer 150 position, and/or the like. The location determination device 158 may be any commercially available device capable of determining, transmitting, or receiving a position or a triangulation with respect to location or position services associated with the trailer 150. As a non-limiting example, the location determination device 158 may be a Garmin, Tile, Spot, and/or the like. Further, it should be appreciated that the battery 156 may be a battery backup for the location determination device 158. As such, in the event the event the battery 156 dies, then the location determination device 158 may shutdown, but will restart once either there is sufficient solar power available to recharge the battery 156 to where the location determination device 158 has ample power to restart or when the first connector 174 is mated with the second connector 176, which results in the battery 156 receiving power from the tow vehicle 101, as discussed in greater detail herein.

The antenna 160 may be any device configured to work with global positioning systems ("GPS"), the location determination device 158, the tracking device 164, the network interface hardware 208 (FIG. 2A), other navigation systems, and/or the like. As such, the antenna 160 may be suitable for receiving signals, such as GPS signals, signals from a user via a mobile device through the network interface hardware 208 (FIG. 2A), and/or the like. As a non-limiting example, the antenna 160 may be a Lowrance, Simrad, Proxicast, and/or the like.

The tracking device 164 is communicatively coupled to the ECU 154, the location determination device 158, the trailer connected input module 152, and the antenna 160. The tracking device 164 is configured to pair with, or work in conjunction with the location determination device 158 and the antenna 160 so to transmit the current real time positioning or location of the trailer 150 when the tracking device 164 is active. It should be appreciated that the tracking and/or transmitting of the current real time location of the trailer 150 may be via geopositioning an object, geofencing, using radio frequency, satellite navigation, radiolocation, and/or the like. In some embodiments, the tracking device 164 is configured to pair with or work in conjunction with the location determination device 158 and the antenna 160 so to triangulate and transmit the current real time positioning or location of the trailer 150 when the tracking device 164 is active. It should be appreciated that the triangulation may be via radio frequencies such as Wi-Fi, a hot spot, or other wired and/or wireless communications.

The tracking device 164 may be configured to be operable by a switch such as a two-position key switch, a two-position toggle switch, a push button switch, electronically switched through the ECU 154, and/or the like. The two-position key switch may be a physical switch that is either in the off position or the on position. The two-position toggle switch may be a physical switch that is either in the off position or the on position. The push button switch may be a physical switch that toggles between the off and on positions based on a number of presses on the push button or any other pattern. It should be appreciated that any of the physical switches may be disposed within or external to the trailer 150. The electronic switch may be remotely turned on and off through an electronic device such as a mobile phone, laptop, and/or the like. The electronic switch may work with an application or other software to communicate with the ECU 154 as explained in greater detail herein. In operation, when the trailer 150 is connected to the tow vehicle 101, such that the first connector 174 is electrically coupled to the second connector 176 of the tow vehicle 101 so to form the electrical connection 172, is recognized by, or alerts the trailer connected input module 152. In turn, the trailer connected input module 152 alerts the ECU 154, and/or other components of the trailer 150. The ECU 154 may then activate the tracking device 164 regardless of whether the tracking device 164 has manually been placed or switched into the off position, as discussed in further detail herein.

The trailer 150 further includes a battery 156. The battery 156 is operably connected to the trailer 150. As such, the battery may power the ECU 154, the location determination device 158, the antenna 160, the trailer connected input module 152, the tracking device 164 and/or the like. In some embodiments, the battery 156 may also power other components of the trailer 150 such as internal lighting, appliances, radio, television, and/or the like whether or not the trailer 150 is connected to the tow vehicle 101 through the electrical connection 172.

In some embodiments, the trailer 150 may further include a plurality of solar panels 178. The plurality of solar panels 178 is operably connected to the trailer 150 and may be configured to power the ECU 154, the location determination device 158, the antenna 160, the trailer connected input module 152, the tracking device 164, and/or the like. In some embodiments, the plurality of solar panels 178 may also power other components of the trailer 150 such as internal lighting, appliances, radio, television, and/or the like whether or not the trailer 150 is connected to the tow vehicle 101 through the electrical connection 172. Moreover, in some embodiments, the plurality of solar panels 178 may be manually activated so to switch the trailer 150 from the battery 156 as a source of power to the plurality of solar panels 178 as the source of power.

The manual activation may be via a physical switch disposed within the trailer 150 and/or remotely via the application accessed by the personal electronic device. In other embodiments, the plurality of solar panels 178 may be used to recharge the battery 156 before, during, and/or after using the battery 156 as a source of power. In still other embodiments, the trailer localizing system 100 may switch between the battery 156 as a source of power and the plurality of solar panels as a source of power or as a battery charger when the battery 156 charge level is equal to or below a predetermined threshold so as to not completely remove the charge of the battery 156. It should be appreciated that it may be necessary to keep the battery charged so to continuously transmit the location or position of the trailer 150, whether or not electrically coupled to the tow vehicle 101, using the various components of the trailer as discussed herein. In some embodiments, when the trailer localizing system 100 is utilizing the plurality of solar panels 178, the ECU 154 is alerted to the plurality of solar panels 178 use, which may activate the tracking device 164 regardless of whether the tracking device 164 has manually been placed or switched into the off position, as discussed in further detail herein. As such, in some embodiments, the user may utilize the plurality of solar panels 178 to localize the trailer. In a nonlimiting example, the user may not remember or be able to find the trailer 150 in a large RV park, storage area, and/or the like. As such, because the plurality of solar panels 178 are active, the trailer localizing system 100 is also active so that the user may be alerted to the location of the trailer 150, as discussed in further detail herein.

Still referring to FIG. 1, the tow vehicle 101 may be an automobile or any other passenger or non-passenger vehicle such as, for example, a pick-up truck or a tractor truck. The tow vehicle 101 includes a trailer output circuit 102 and a tow electronic control unit ("tow ECU") 104, both in communication with one another via a communication link 106. The towing vehicle further includes the second connector 176 communicatively coupled to the trailer output circuit 102. The various components of the tow vehicle 101 and the interaction thereof will be described in detail below.

Still referring to FIG. 1, the communication link 106 may be formed from any medium that is capable of transmitting a signal such as, for example, conductive wires, conductive traces, optical waveguides, or the like. Moreover, the communication link 106 may be formed from a combination of mediums capable of transmitting signals. In one embodiment, the communication link 106 comprises a combination of conductive traces, conductive wires, connectors, and buses that cooperate to permit the transmission of electrical data signals to components such as processors, memories, sensors, input devices, output devices, and communication devices. Accordingly, the communication link 106 may comprise a towing vehicle bus, such as for example a LIN bus, a CAN bus, a VAN bus, and the like. The communication link 106 communicatively couples the various components of the tow vehicle 101.

The trailer output circuit 102 is communicatively coupled to the tow ECU 104. The trailer output circuit 102 is electrically coupled to one or more components of the trailer 150 by a conductive medium, such as the second connector 176. The trailer output circuit 102 is controlled by the tow ECU 104 and supplies an electrical trailer output signal, current, and/or voltage via the second connector 176 through the pigtail with the first connector 174 and into the trailer connected input module 152 of the trailer 150. The trailer output circuit 102 may create the electrical connection 172 to electrically couple the tow vehicle 101 to the trailer 150.

In some embodiments, the trailer output circuit 102 may supply a signal and/or a current from a power system 108 of the tow vehicle 101. As such, this supplied current may power a number of components of the trailer 150 such as external lights (i.e., running lights, brake lights, and turn signal lights), the trailer connected input module 152, the location determination device 158, the tracking device 164, the ECU 154, the antenna 160, the wheel speed sensors 162, and/or the trailer brakes 170.

Now referring to FIG. 2A, a schematic depiction of illustrative hardware components of the trailer 150 that may be used in the trailer localizing system 100 will now be described. While the components depicted in FIG. 2A are described with respect to the trailer 150, it should be understood that similar components may also be used outside or external to the trailer 150 without departing from the scope of the present disclosure.

The ECU 154 may have a non-transitory computer-readable medium for completing the various processes described herein, embodied as hardware, software, and/or firmware, according to embodiments shown and described herein. While in some embodiments the ECU 154 may be configured as a general purpose computer with the requisite hardware, software, and/or firmware, in other embodiments, the ECU 154 may also be configured as a special purpose computer designed specifically for performing the functionality described herein. For example, the ECU 154 may be a device that is particularly adapted to activate a localization system configured for determining or tracking a location, in real-time, of the trailer 150 and transmitting the location to an external device such as a mobile electronic device. In another example, the ECU 154 may be a device that is particularly adapted to utilize the wheel speed sensors 162 for the purposes of monitoring the trailer conditions, monitoring the trailer 150 for having movement that may or may not be authorized, and executing commands to the other components of the trailer 150 such as the trailer brakes 170 to stop or inhibit movement of the trailer 150. In embodiments where the ECU 154 is a general purpose computer, the systems and methods described herein provide a mechanism for improving functionality by providing a localization or tracking device that is kept active when there is an electrical connection between the trailer 150 and the tow vehicle 101 and providing a real time visual display of the trailer 150 to a user.

Figure 2A:
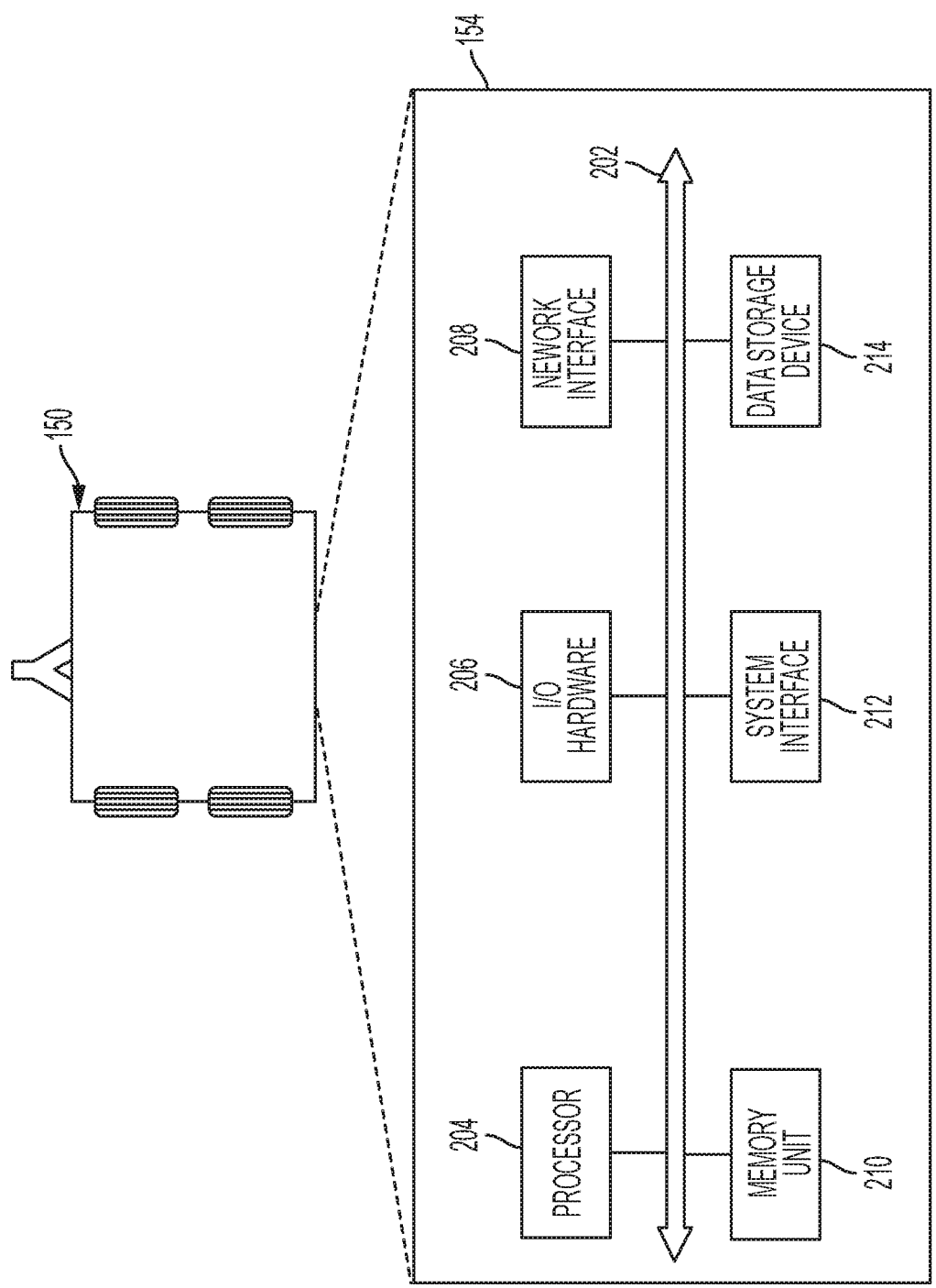
FIG. 2A schematically depicts illustrative hardware components of an electronic control unit that may be used in the trailer localizing system according to one or more embodiments shown and described herein.

Now referring to FIG. 2A, the ECU 154 may generally be an onboard computing system. In some embodiments, the ECU 154 may be a plurality of vehicle computing systems. The ECU 154 may include a processor 204, an I/O hardware 206, a network interface hardware 208, a non-transitory memory 210, a system interface 212, and data storage device 214. A local interface 202, such as a bus or the like, may interconnect the various components. The processor 204, such as a computer processing unit (CPU), may be the central processing unit of the ECU 154, performing calculations and logic operations to execute a program. The processor 204, alone or in conjunction with the other components, is an illustrative processing device, computing device, or combination thereof. The processor 204 may include any processing component configured to receive and execute instructions (such as from the data storage device 214 and/or the memory 210).

Still referring to FIG. 2A, the memory 210 may be configured as a volatile and/or a nonvolatile computer-readable medium and, as such, may include random access memory (including SRAM, DRAM, and/or other types of random access memory), read only memory (ROM), flash memory, registers, compact discs (CD), digital versatile discs (DVD), and/or other types of storage components. The memory 210 may include one or more programming instructions thereon that, when executed by the processor 204, cause the processor 204 to complete various processes, such as the processes described herein with respect to FIGS. 3-4. Still referring to FIG. 2A, the programming instructions stored on the memory 210 may be embodied as a plurality of software logic modules, where each logic module provides programming instructions for completing one or more tasks, as described in greater detail below with respect to FIG. 2B.

The I/O hardware 206 may communicate information between the local interface 202 and one or more other components of the tow vehicle 101. For example, the I/O hardware 206 may act as an interface between the ECU 154 and other components, such as the location determination device 158, other navigation systems, vehicle meter units, mobile phone systems, infotainment systems, and/or the like. In some embodiments, the I/O hardware 206 may be utilized to transmit one or more commands to the other components of the trailer 150. Further, the I/O hardware 206 may receive inputs from the wheel speed sensors 162 or the pigtail having the first connector 174.

The network interface hardware 208 may include any wired or wireless networking hardware, such as a modem, a LAN port, a wireless fidelity (Wi-Fi) card, WiMax card, mobile communications hardware, and/or other hardware for communicating with other networks and/or devices. For example, the network interface hardware can include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like. The network interface hardware 208 may provide a communications link between the trailer 150 and the other networks using the antenna 160 so to connect to, without limitation, Google Maps, Waze, the user's electronic mobile device, and/or the like.

The system interface 212 may generally provide the ECU 154 with an ability to interface with one or more external devices such as, for example, the mobile electronic device. Communication with external devices may occur using various communication ports, wirelessly, and/or the like.

Still referring to FIG. 2A, the data storage device 214, which may generally be a storage medium, may contain one or more data repositories for storing data that is received and/or generated. The data storage device 214 may be any physical storage medium, including, but not limited to, a hard disk drive (HDD), memory, removable storage, and/or the like. While the data storage device 214 is depicted as a local device, it should be understood that the data storage device 214 may be a remote storage device, such as, for example, a server-computing device or the like. Illustrative data that may be contained within the data storage device 214 is described below with respect to FIG. 2C. It should be appreciated that the amount of available storage space in the data storage device 214 may be limited due to its location in the ECU 154 in some embodiments. As such, it may be necessary to minimize the size of the data stored thereon.

Still referring to FIG. 2A, the ECU 154 is configured to control the tracking device 164, the location determination device 158, and the at least one trailer brake 170 based on one or more inputs received via the communication path 166 (i.e., based on the trailer connected input module 152) and based on inputs received by the ECU 154 (i.e., from the I/O hardware 206 and from the local interface 202), as will be described in further detail herein.

Figure 2B:
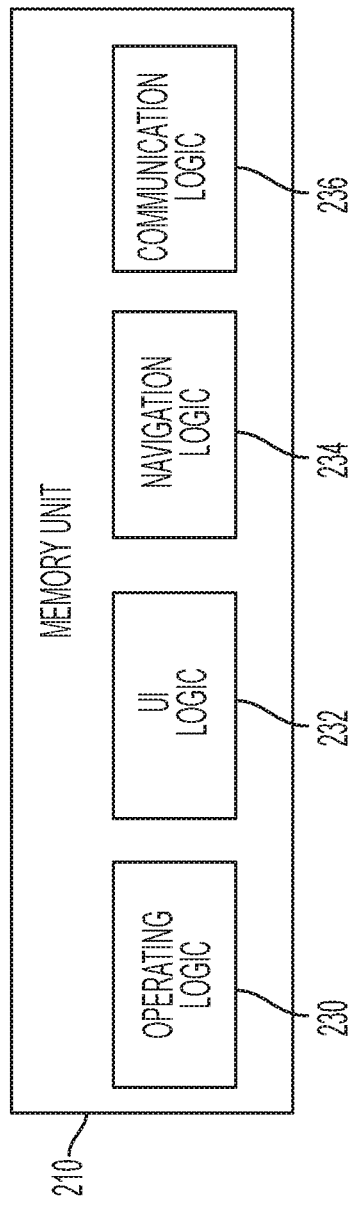
FIG. 2B schematically depicts an illustrative memory component containing illustrative logic components according to one or more embodiments shown and described herein.

With reference to FIG. 2B, in some embodiments, the program instructions contained on the memory 210 may be embodied as a plurality of software modules, where each module provides programming instructions for completing one or more tasks. For example, FIG. 2B schematically depicts the memory 210 containing illustrative logic components according to one or more embodiments shown and described herein. As shown in FIG. 2B, the memory 210 may be configured to store various processing logic, such as, for example, operating logic 230, UI logic 232, navigation logic 234, and/or communication logic 236, (each of which may be embodied as a computer program, firmware, or hardware, as an example). The operating logic 230 may include an operating system and/or other software for managing components of the trailer localizing system 100. Further, the operating logic 230 may contain one or more software modules for transmitting data, and/or analyzing data.

Still referring to FIG. 2B, the UI logic 232 may contain one or more software modules, each module having one or more programming instructions for providing a user interface to a user, sending messages to the user, receiving commands from the user, and/or the like. The navigation logic 234 may contain one or more software modules, each module having one or more programming instructions related to localizing, tracking and/or triangulating the location and/or position of the trailer 150 in real-time, including recognizing when the electrical connection 172 is made so to override the tracking device 164 thereby activating the tracking device 164, and including recognizing when the trailer 150 is using the plurality of solar panels 178 so to override the tracking device 164 thereby activating the tracking device 164, as discussed in greater detail herein.

The communication logic 236 may contain one or more software modules, each module having one or more programming instructions for collecting, analyzing, converting, and/or transmitting data from and/or to one or more sources (i.e., data extracted from the trailer connected input module 152 (FIG. 1), the wheel speed sensors 162 (FIG. 1), and/or the like. For example, the communication logic may instruct the processor 204 (FIG. 2A) to activate at least one trailer brake 170 when there is an unauthorized movement of the trailer 150 as discussed in greater detail herein.

Figure 2C:
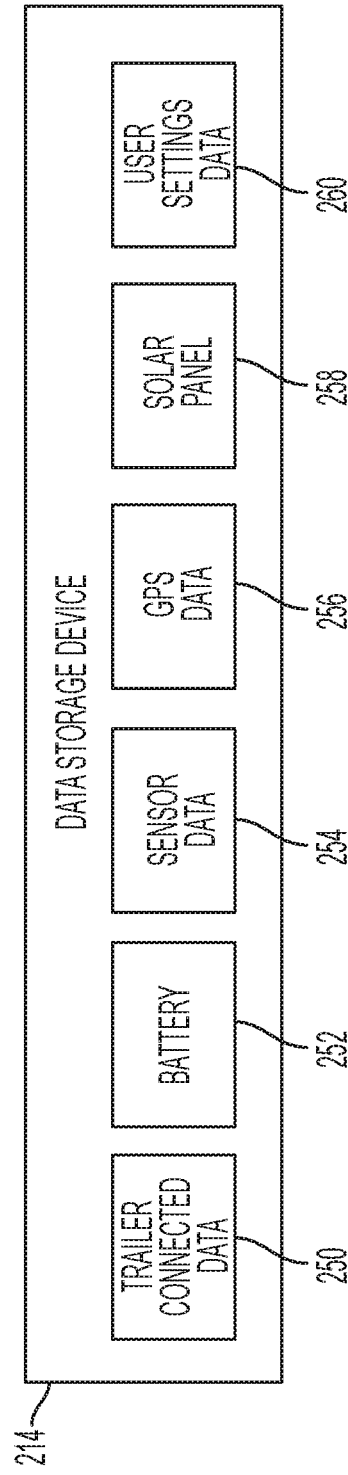
FIG. 2C schematically depicts an illustrative data storage device containing illustrative data components according to one or more embodiments shown and described herein.

FIG. 2C schematically depicts a block diagram of various data contained within a storage device (e.g., the data storage device 214). As shown in FIG. 2C, the data storage device 214 may include, for example, trailer connected data 250, that may include data relating to whether there is the electrical connection 172 between the first connector 174 of the trailer 150 and the second connector 176 of the tow vehicle 101. The trailer connected data 250 may also include data related to the tow vehicle 101 such as the current and/or signals output by the trailer output circuit 102 (FIG. 1).

The data storage device 214 may further include, for example, a battery data 252 such as a current charge of the battery 156 (FIG. 1), whether the battery 156 (FIG. 1) is currently in use as the power source, and/or a predetermined threshold value that may be based on the current power usage, such as a lookup table that establishes the threshold value correlated with power usage, as discussed in greater detail herein. The data storage device 214 may further include a plurality of sensor data 254, such as data acquired from the wheel speed sensors 162 (FIG. 1). For instance, the plurality of sensor data 254 may include data from the at least one wheel speed sensor 162 (FIG. 1) configured to detect whether at least one trailer wheel 168 (FIG. 1) are in motion. The data storage device 214 may further include a GPS data 256, such as data received by the antenna 160 (FIG. 1) and the location determination device 158 (FIG. 1) to determine the location of the trailer 150 (FIG. 1), to determine a triangulation position of the trailer 150 (FIG. 1), and/or the like, as will be discussed in greater detail herein. The data storage device 214 may further include a solar panel data 258. The solar panel data 258 may include data related to the plurality of solar panels 178 (FIG. 1) such as whether the plurality of solar panels 178 (FIG. 1) is currently in use as the power source, and/or is used as a charger for the battery 156 (FIG. 1) as discussed in greater detail herein. The data storage device 214 may further include a user settings data 260. The user settings data 260 may include, for example, data associated with particular user settings for the trailer localizing system 100, such as UI preferences settings, control preferences settings, and/or the like.

It should be understood that the components illustrated in FIGS. 2A-2C are merely illustrative and are not intended to limit the scope of this disclosure. More specifically, while the components in FIGS. 2A-2C are illustrated as residing within the trailer localizing system 100, this is a nonlimiting example. In some embodiments, one or more of the components may reside external to the trailer localizing system 100.

As mentioned above, the various components described with respect to FIGS. 2A-2C may be used to carry out one or more processes and/or provide functionality for determining the location of the trailer 150, especially while moving and for guiding the user to locate the trailer 150, and for alerting the user of trailer movement. An illustrative example of the various processes are described with respect to FIGS. 3-4 hereinbelow.

Figure 3:
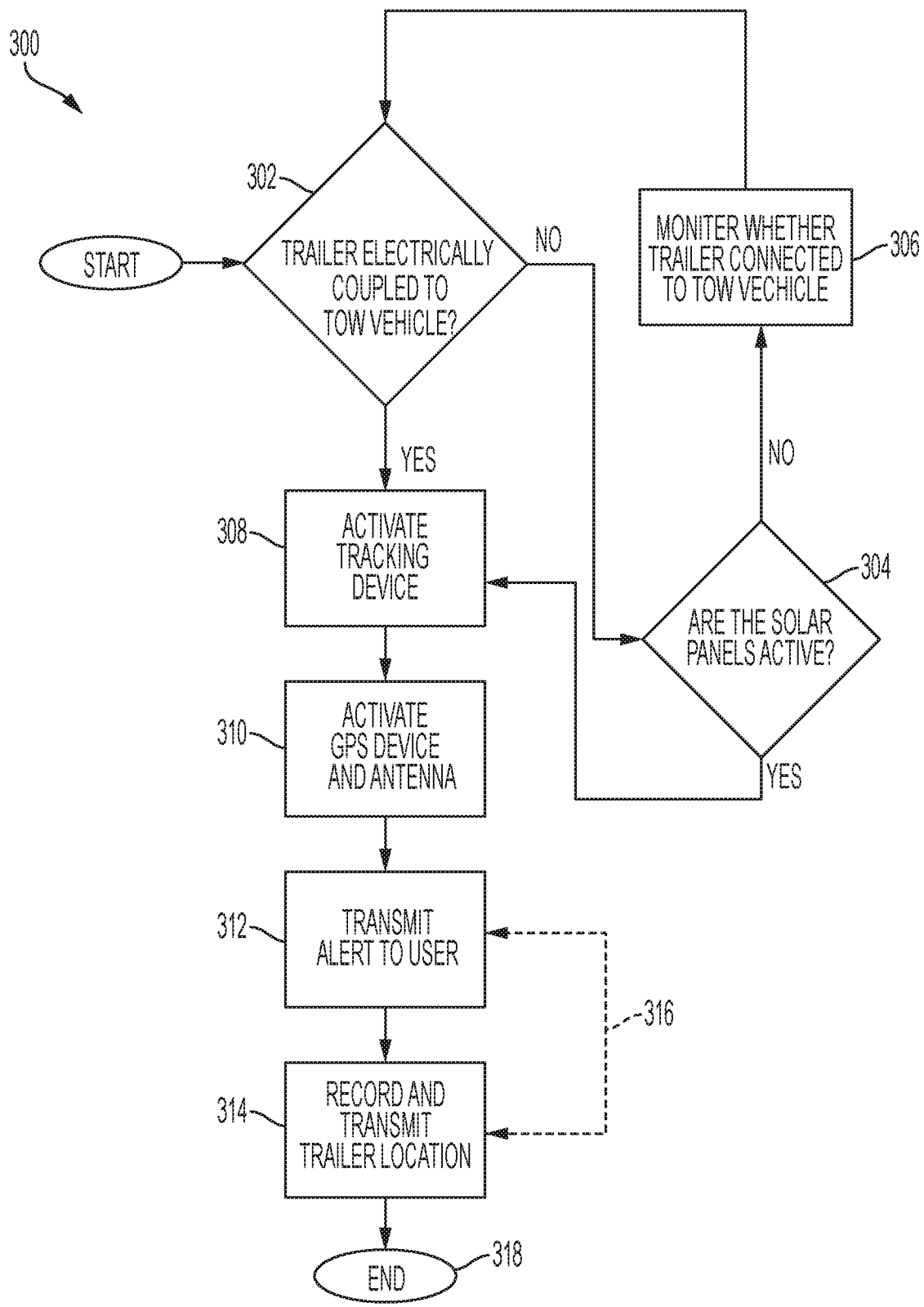
FIG. 3 schematically depicts a flowchart of an exemplary method for localizing a trailer, according to one or more embodiments shown and described herein.

FIG. 3 schematically depicts a flowchart of an exemplary method 300 for localizing the trailer 150. Referring now to FIGS. 1 and 3, at block 302 a determination is made regarding whether the trailer 150 is electrically coupled to the tow vehicle 101. The trailer 150 may be electrically coupled the tow vehicle 101 via the electrical connection 172 created when the pigtail having the first connector 174 mates to the second connector 176. If the electrical connection 172 is not established at block 302, the system determines whether the plurality of solar panels 178 are active at block 304. If the plurality of solar panels 178 are not currently active, then, at block 306, the trailer localizing system 100 monitors whether the trailer 150 is connected to the tow vehicle 101 or whether the solar panels are active by looping back to block 302 and block 304 continuously until the exemplary method 300 recognizes that the trailer 150 is connected to the tow vehicle 101 at block 302 or that the solar panels are active at block 304.

Still referring to the exemplary method 300, it should be appreciated that the tracking device 164 actively tracks, bypassing any on/off switch whenever the trailer 150 is either electrically connected to the tow vehicle 101 at block 302 or when the solar panels are active, or in use, at block 304. As such, when the trailer 150 is electrically connected to the tow vehicle 101 at block 302 or when the solar panels are active, or in use, at block 304, the tracking device 164 is activated regardless of the current on/off position of the switch at block 308. Along with activating the tracking device 164, the location determination device 158 and the antenna 160 are also activated at block 310. An alert is generated and transmitted to the user at block 312 indicating that the tracking device 164 is active. The trailer localizing system 100, at block 314, may then record and transmit the trailer 150 location either as part of the alert of block 312 or as a separate message to the user.

It should be appreciated that the alert may be a text message, a notification driven from an application such as an application saved on an electronic mobile device, a prerecorded message, an e-mail, and/or the like. The alert may include information such as the triangulation of the current position of the trailer 150 at the time of sending the alert, the geolocation of the trailer 150 at the time of sending the alert, and/or the like. Further, the alert may direct the user to an application configured to be in communication with the ECU 154 so to continuously provide the user with the alerts at block 312 and/or record and transmit the trailer location at block 314, as illustrated by the dotted line 316. The user may elect to continuously receive these alerts and/or tracking information. In some embodiments, the user may set up a predetermined time lapse between alerts and/or tracking information. For example, the user may wish to only be notified that the tracking device 164 is active and the location information every five minutes, whereas other users may want to know the same information every 30 seconds. Further, in some embodiments, the information provided by the trailer localizing system 100 may be directed to local law enforcement or other individuals that the user provides access through the application. When the user elects to not receive any further alerts, indicated by dotted line 316 and blocks 312 and 314, for this specific solar panel active alert or the trailer 150 electrically coupled to the tow vehicle 101 alert, the exemplary method 300 ends at block 318.

Thus, in an embodiment and with respect to FIG. 3, a trailer localizing system 100 comprises a tow vehicle 101, a trailer 150 configured to be coupled to the tow vehicle 101 for towing by the tow vehicle 101, a memory 210, and machine readable instructions stored in the memory 210. The trailer 150 comprises a plurality of solar panels 178, a location determination device 158, a tracking device 164 communicatively coupled with the location determination device 158 to transmit a current real time position of the trailer 150 when the tracking device 164 is active, and an ECU 154 communicatively coupled to the plurality of solar panels 178, the tracking device 164, and the location determination device 158. The memory 210 is communicatively coupled to the ECU 154. The machine readable instructions cause the trailer localizing system 100 to perform at least the following when executed by the electronic control unit 154: (i) determine by the electronic control unit 154 whether the trailer 150 is electronically connected to the tow vehicle 101, (ii) determine whether the plurality of solar panels 178 are active upon a determination that the trailer is not electrically connected to the tow vehicle 101, (iii) activate the tracking device 164 along with the location determination device 158 upon a determination that the trailer 150 is electronically connected to the tow vehicle 101, the plurality of solar panels 178 are active, or both, (iv) generate an alert that the tracking device 164 is active upon activation of the tracking device 164, and (iv) transmit the current real time position of the trailer 150 with the alert to track the trailer 150.

In embodiments, as described in FIG. 4 below, the ECU 154 may whether a wheel 168 of the trailer 150 is rotating at a wheel speed that is above a threshold speed to activate the tracking device 164 along with the location determination device 158 upon a determination that (i) the trailer 150 is electronically connected to the tow vehicle 101, (ii) the plurality of solar panels 178 are active, (iii) the wheel 168 of the trailer 150 is rotating at the wheel speed that is above the threshold speed, or (iv) combinations thereof. In further embodiments, as described with respect to FIG. 4 below, the alert is configured to prompt a user to indicate whether movement of the trailer is authorized. The machine readable instructions may further cause the trailer localizing system 100 to activate trailer brakes based on an indication by the user that the movement of the trailer is unauthorized. In another embodiment, the machine readable instructions may cause the trailer localizing system 100 to determine by the ECU 154 whether the wheel speed is below a threshold brake speed, and activate one or more trailer brakes 170 based on an indication by the user that the movement of the trailer 150 is unauthorized and a determination that the wheel speed is below the threshold brake speed.

Figure 4:
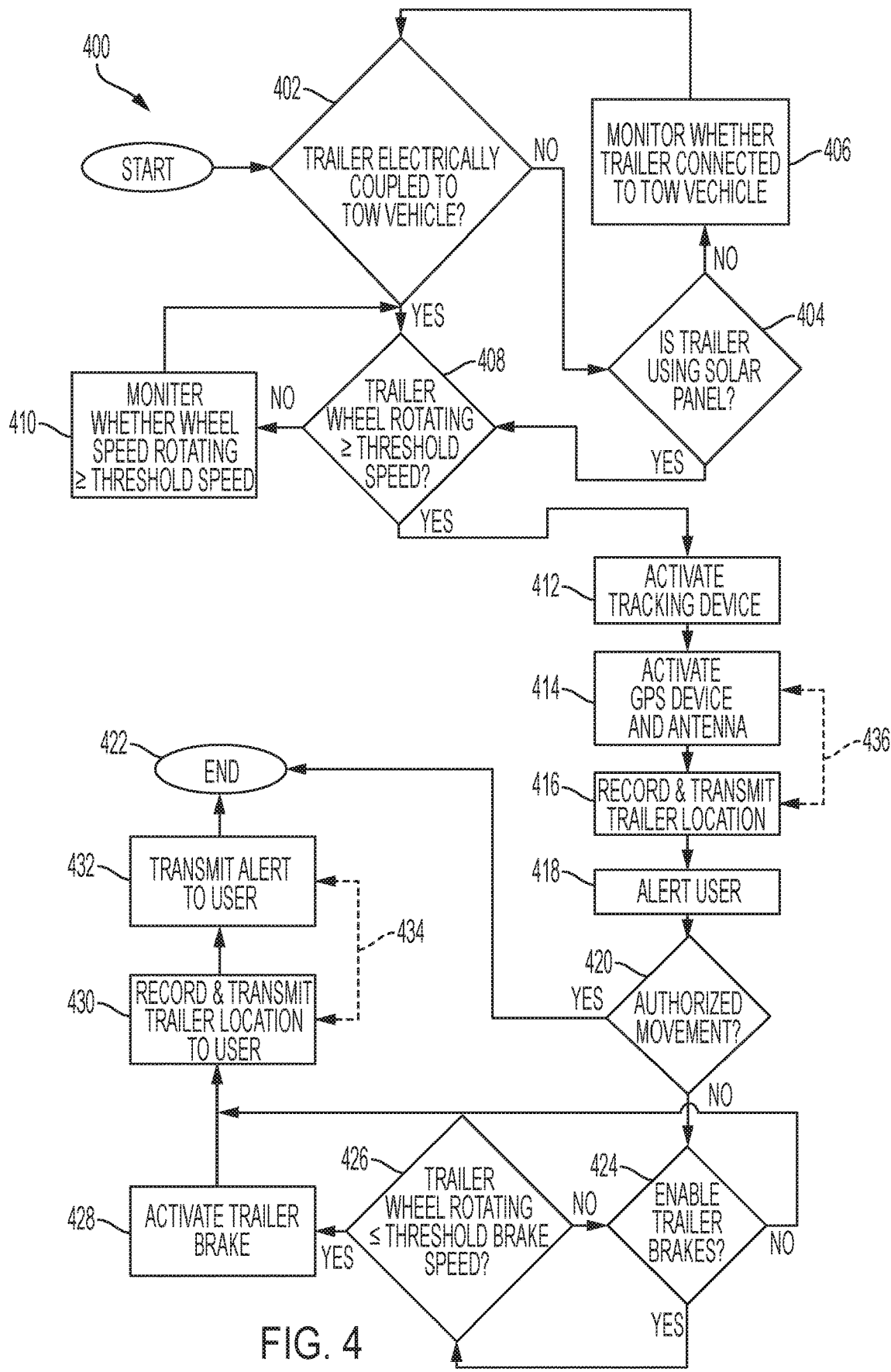
FIG. 4 schematically depicts a flowchart of an exemplary method for localizing a trailer and enabling a trailer brake, according to one or more embodiments shown and described herein.

By way of example, and not as a limitation, FIG. 4 schematically depicts a flowchart of an exemplary method 400 for tracking the trailer 150. Referring now to FIGS. 1 and 4, at block 402 a determination is made regarding whether the trailer 150 is electrically coupled to the tow vehicle 101. The trailer 150 may be electrically coupled the tow vehicle 101 via the electrical connection 172 created when the pigtail having the first connector 174 mates to the second connector 176. If the electrical connection 172 is not established at block 402, the system determines whether the plurality of solar panels 178 is active at block 404. If the plurality of solar panels 178 is not currently active, then, at block 406, the trailer localizing system 100 monitors whether the trailer 150 is connected to the tow vehicle 101 or whether the solar panels are active by looping back to block 402 and block 404 until the exemplary method 400 recognizes that the trailer 150 is connected to the tow vehicle 101 at block 402 or that the solar panels are active at block 404.

Still referring to the example method 400, if the trailer 150 is electrically connected to the tow vehicle 101 at block 402 or if the plurality of solar panels 178 is active at block 404, the trailer localizing system 100 determines whether the trailer wheel 168 of the trailer 150 is rotating equal to or above a threshold speed, at block 408. The threshold speed may be one of the plurality of user settings stored in the user settings data 260 (FIG. 2C). As such, generally, the threshold speed is a predetermined speed and may be set to include a zero miles per hour speed. For example, the user may want to know anytime that the trailer 150 is electrically connected to a tow vehicle 101 or when the plurality of solar panels 178 is activated, thus, the wheel speed could be zero in both of these instances and the trailer localizing system 100 and example method 400 would alert the user, as discussed in further detail herein. The wheel speed may be the speed of rotation of the trailer wheel 168 as determined by the wheel speed sensors 162. If the speed of the trailer 150 is less than the trailer threshold at block 408, then the trailer localizing system 100 monitors the wheel speed of the trailer 150, at block 410, and loops with the decision of whether the trailer wheel 168 of the trailer 150 is rotating equal to or above the threshold speed at block 408.

On the other hand, if the trailer wheel 168 is rotating equal to or above the threshold speed, then the tracking device 164 is activated at block 412. It should be appreciated that the tracking device 164 actively tracks, bypassing any on/off switch whenever the trailer 150 is either electrically connected to the tow vehicle 101 at block 402 or when the plurality of solar panels 178 is active, or in use, at block 404, and the speed of the trailer 150 is equal to or greater than the speed threshold value at block 408. As such, when the trailer 150 is electrically connected to the tow vehicle 101 at block 402 or when the plurality of solar panels 178 is active, or in use, at block 404, and the speed of the trailer 150 is greater than the threshold value at block 408, the tracking device 164 is activated regardless of the current on/off position of the switch at block 408. Along with activating the tracking device 164, the location determination device 158 and the antenna 160 are also activated at block 414. The trailer localizing system 100, at block 416, may then record and transmit the trailer 150 location as either a part of the alert of block 418 or as a separate message to the user. The alert is generated and transmitted to the user at block 418 indicating that the tracking device 164 is active.

It should be appreciated that the alert may be a text message, a notification driven from an application such as an application saved on an electronic mobile device, a prerecorded message, an e-mail, and/or the like. The alert may include information such as the triangulation of the current position of the trailer 150 at the time of sending the alert, the geolocation of the trailer 150 at the time of sending the alert, and/or the like. Further, the alert may direct the user to an application configured to be in communication with the ECU 154 so to continuously provide the user with the alerts at block 416 and/or record and transmit the trailer location at block 414, as illustrated by the dotted line 436. The alert may prompt the user to indicate whether the movement of the trailer is authorized, at block 420. If the movement of the trailer 150 is authorized, then the exemplary method 400 ends at block 422. The movement of the trailer may be authorized when the user is moving the trailer 150, when the user permits someone else to move the trailer 150, and/or other situations in which the user believes that the trailer 150 is being moved with authorization.

On the other hand, if the trailer 150 is being moved without authorization, the user may elect to instruct the trailer localizing system 100 that the movement is not authorized at block 420. When the unauthorized use is confirmed, the ECU 154 prepares to enable the trailer brakes at block 424. The trailer brake enablement is based on determining whether the trailer wheel 168 has a rotating speed equal to or below a brake threshold value at block 426. The brake threshold value may be one of the plurality of user settings stored in the user settings data 260 (FIG. 2C). As such, generally, the brake threshold value is a predetermined speed and may be set to a minimum speed so when the brakes are applied not to damage the trailer 150, the tow vehicle 101 and/or injure any person or object. For example, the brake threshold value may be set to a zero miles per hour speed such that when the speed of the trailer 150 as determined by the wheel speed sensors 162 is zero miles per hour, the ECU 154 will activate the trailer brakes 170 at block 428 and then may record and transmit the trailer 150 location as either another alert or as a separate message to the user at block 430. The ECU 154 may activating trailer brakes 170 of the trailer 150 based on an indication by the user, in response to the alert, that the movement of the trailer is unauthorized and a determination that the wheel speed is below the threshold brake speed.

The message or alert may include current information related to the GPS location of the trailer 150, the triangulation position of the trailer 150, the brake engagement confirmation, and/or the like. Further, the alert may direct the user to an application configured to be in communication with the ECU 154 so to continuously provide the user with the alerts at block 432 and/or record and transmit the trailer location at block 430, as illustrated by the dotted line 434. The user may elect to continuously receive these alerts and/or tracking information. In some embodiments, the user may set up a predetermined time lapse between alerts and/or tracking information. For example, the user may wish to only be notified that the tracking device 164 is active and the location information every five minutes, whereas other users may want to know the same information every 30 seconds. Further, in some embodiments, the information provided by the trailer localizing system 100 may be directed to local law enforcement or other individuals that the user provides access through the application.

On the other hand, if the trailer wheel 168 is rotating above the brake threshold value at block 426, then the wheel speed of the trailer 150 is monitored by looping with the decision of whether to enable the trailer brakes 170 at block 424 until either the speed is less than the brake threshold value at block 426 or when the user identifies not to enable the trailer brakes 170 at block 424. If the user identifies not to enable the trailer brakes 170 at block 424, the tracking device 164 is still active and then may record and transmit the trailer 150 location at block 430 as either another alert or as a separate message to the user at block 432. The message or alert may include current information related to the GPS location of the trailer 150, the triangulation position of the trailer 150, the brake non-engagement confirmation, and/or the like. Further, the alert may direct the user to an application configured to be in communication with the ECU 154 so to continuously provide the user with the alerts at block 432 and/or record and transmit the trailer location at block 430, as illustrated by the dotted line 434. The user may elect to continuously receive these alerts and/or tracking information. In some embodiments, the user may set up a predetermined time lapse between alerts and/or tracking information. For example, the user may wish to only be notified that the tracking device 164 is active and the location information every five minutes, whereas other users may want to know the same information every 30 seconds. Further, in some embodiments, the information provided by the trailer localizing system 100 may be directed to local law enforcement or other individuals that the user provides access through the application.

It should now be understood that embodiments described herein provide systems and methods for tracking a trailer, such as a recreational trailer, based on whether the trailer is electrically coupled to a tow vehicle and/or when a solar panel is active. The tracking of the trailer may permit a remote activation of the trailer brakes when the trailer is traveling at a speed below a threshold value. Furthermore, a user is able to remotely track the trailer movement based on GPS systems and wired or wireless radio frequencies such as triangulation of a position using cell towers. As such, the systems and methods for localizing the trailer alerts a user when there is the electrical coupling of the trailer to the tow vehicle thereby providing the user with the capability of localizing and/or actively tracking the trailer during an unintended movement or theft of the trailer.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A trailer localizing system comprising:
   a tow vehicle;
   a trailer configured to be coupled to the tow vehicle for towing by the tow vehicle, the trailer comprising
      a plurality of solar panels,
      a location determination device,
      a tracking device communicatively coupled with the location determination device to transmit a current real time position of the trailer when the tracking device is active, and
      an electronic control unit communicatively coupled to the plurality of solar panels, the tracking device, and the location determination device;
   a memory communicatively coupled to the electronic control unit; and
   machine readable instructions stored in the memory, wherein the machine readable instructions cause the trailer localizing system to perform at least the following when executed by the electronic control unit
      determine by the electronic control unit whether the trailer is electronically connected to the tow vehicle,
      determine whether the plurality of solar panels are active upon a determination that the trailer is not electrically connected to the tow vehicle,
      activate the tracking device along with the location determination device upon a determination that the trailer is electronically connected to the tow vehicle, the plurality of solar panels are active, or both,
      generate an alert that the tracking device is active upon activation of the tracking device, and
      transmit the current real time position of the trailer with the alert to track the trailer.

2. The trailer localizing system of claim 1, wherein the machine readable instructions further cause the trailer localizing system to perform at least the following when executed by the electronic control unit
   determine by the electronic control unit whether a wheel of the trailer is rotating at a wheel speed that is above a threshold speed;
   activate the tracking device along with the location determination device upon a determination that the wheel of the trailer is rotating at the wheel speed that is above the threshold speed.

3. The trailer localizing system of claim 2, wherein the wheel speed of the wheel of the trailer is determined by one or more wheel speed sensors.

4. The trailer localizing system of claim 1, wherein the alert is configured to prompt a user to indicate whether movement of the trailer is authorized.

5. The trailer localizing system of claim 4, wherein the machine readable instructions further cause the trailer localizing system to perform at least the following when executed by the electronic control unit
   activate trailer brakes based on an indication by the user that the movement of the trailer is unauthorized.

6. The trailer localizing system of claim 4, wherein the machine readable instructions further cause the trailer localizing system to perform at least the following when executed by the electronic control unit
   determine by the electronic control unit whether the wheel speed is below a threshold brake speed; and
   activate trailer brakes based on an indication by the user that the movement of the trailer is unauthorized and a determination that the wheel speed is below the threshold brake speed.

7. The trailer localizing system of claim 1, wherein the location determination device comprises a global positioning system (GPS) device, a global navigation satellite system (GNSS), or combinations thereof.

8. The trailer localizing system of claim 1, wherein the trailer further comprises a battery, and the plurality of solar panels are configured to recharge the battery.

9. The trailer localizing system of claim 1, wherein the trailer is configured to be electronically connected to the tow vehicle through an electrical coupling comprising an electrical connector.

10. The trailer localizing system of claim 9, wherein the electrical connector comprises a four-way connector.

11. The trailer localizing system of claim 9, wherein the electrical connector comprises a seven-way connector.

12. The trailer localizing system of claim 9, wherein the trailer comprises a pigtail including a first connector of the electrical connector configured to mate with a second connector of the electrical connector, the second connector embedded within the tow vehicle.

13. The trailer localizing system of claim 12, wherein the first connector comprises one of a female connector and a male connector, and the second connector comprises the other of the female connector and the male connector.

14. The trailer localizing system of claim 12, wherein when the first connector is mated in an electrical connection with the second connector, the electronic control unit is configured to determine the trailer is electronically connected to the tow vehicle based on a signal associated with the electrical connection, a closed circuit current associated with the electrical connection, a closed circuit voltage associated with the electrical connection, or combinations thereof.

15. A trailer localizing system comprising:
a tow vehicle;
a trailer configured to be coupled to the tow vehicle for towing by the tow vehicle, the trailer comprising
a plurality of solar panels,
a location determination device,
a tracking device communicatively coupled with the location determination device to transmit a current real time position of the trailer when the tracking device is active, and
an electronic control unit communicatively coupled to the plurality of solar panels, the tracking device, and the location determination device;
a memory communicatively coupled to the electronic control unit; and
machine readable instructions stored in the memory, wherein the machine readable instructions cause the trailer localizing system to perform at least the following when executed by the electronic control unit
determine by the electronic control unit whether the trailer is electronically connected to the tow vehicle,
determine whether the plurality of solar panels are active upon a determination that the trailer is not electrically connected to the tow vehicle,
determine by the electronic control unit whether a wheel of the trailer is rotating at a wheel speed that is above a threshold speed,
activate the tracking device along with the location determination device upon a determination that the trailer is electronically connected to the tow vehicle, the plurality of solar panels are active, the wheel of the trailer is rotating at the wheel speed that is above the threshold speed, or combinations thereof,
generate an alert that the tracking device is active upon activation of the tracking device, wherein the alert is configured to prompt a user to indicate whether movement of the trailer is authorized, and
transmit the current real time position of the trailer with the alert to track the trailer.

16. The trailer localizing system of claim 15, wherein the machine readable instructions further cause the trailer localizing system to perform at least the following when executed by the electronic control unit
activate trailer brakes based on an indication by the user that the movement of the trailer is unauthorized.

17. The trailer localizing system of claim 15, wherein the machine readable instructions further cause the trailer localizing system to perform at least the following when executed by the electronic control unit
determine by the electronic control unit whether the wheel speed is below a threshold brake speed;
activate trailer brakes based on an indication by the user that the movement of the trailer is unauthorized and a determination that the wheel speed is below the threshold brake speed.

18. The trailer localizing system of claim 15, wherein the wheel speed of the wheel of the trailer is determined by one or more wheel speed sensors.

19. A method of tracking a trailer configured to be coupled to a tow vehicle for towing by the tow vehicle, the trailer comprising
a plurality of solar panels;
a location determination device;
a tracking device communicatively coupled with the location determination device to transmit a current real time position of the trailer when the tracking device is active; and
an electronic control unit communicatively coupled to the plurality of solar panels, the tracking device, and the location determination device; and
the method comprising:
determining by the electronic control unit whether the trailer is electronically connected to the tow vehicle,
determining whether the plurality of solar panels are active upon a determination that the trailer is not electrically connected to the tow vehicle,
activating the tracking device along with the location determination device upon a determination that the trailer is electronically connected to the tow vehicle, the plurality of solar panels are active, or both,
generating an alert that the tracking device is active upon activation of the tracking device, and
transmitting the current real time position of the trailer with the alert to track the trailer.

20. The method of claim 19, further comprising:
activating the tracking device along with the location determination device upon a determination that a wheel of the trailer is rotating at a wheel speed that is above a threshold speed; and
activating one or more trailer brakes of the trailer based on an indication by a user, in response to the alert, that movement of the trailer is unauthorized and a determination that the wheel speed is below a threshold brake speed.

* * * * *